United States Patent [19]

Jakob

[11] 3,814,388
[45] June 4, 1974

[54] DYEING PROCESS FOR SYNTHETIC MATERIALS

[75] Inventor: Peter Jakob, Offenbach, Germany

[73] Assignee: Colortronic Reinhard & Co. KG, Friedrichsdorf-Koppern, Germany

[22] Filed: Jan. 28, 1972

[21] Appl. No.: 221,678

[30] Foreign Application Priority Data
Feb. 16, 1971 Germany.................... 7105798[U]
Apr. 10, 1971 Germany.................... 2117588
Apr. 29, 1971 Germany.................... 2121033

[52] U.S. Cl................ 259/191, 137/99, 425/317
[51] Int. Cl. ...... B29b 1/04, B29b 3/00, G05d 11/35
[58] Field of Search .......... 259/185, 186, 187, 188, 259/189, 190, 191, 192, 193, 194, 195, 9, 10, 25, 26; 425/200–209, 317, DIG. 9; 137/98, 99, 1

[56] References Cited
UNITED STATES PATENTS
2,694,224  11/1954  Rhodes .......................... 259/194
3,442,283  5/1969   Williams ........................ 137/98
3,477,698  11/1969  Smith et al..................... 259/25
3,694,227  9/1972   Vezzani ...................... 259/185 X FOREIGN PATENTS OR APPLICATIONS
632,511  1/1962  Italy..................... 259/8

Primary Examiner—Billy J. Wilhite
Assistant Examiner—Alan I. Cantor
Attorney, Agent, or Firm—Webb, Burden, Robinson & Webb

[57] ABSTRACT

Method for adding liquid color to uncolored synthetics. The dyestuffs are metered by an electronically controlled metering pump and delivered to the synthetics just before or after the synthetic enters the plasticizer of a fabrication device.

5 Claims, 2 Drawing Figures

DYEING PROCESS FOR SYNTHETIC MATERIALS

This invention relates to a process for adding liquid dyes to synthetic materials or plastics, for example, thermoplastics, that may be processed in any of a number of desired ways, for example, by injection, molding or extrusion.

Up to the present time, in the processing of synthetics, materials or plastics, the dyeing and plasticizing have been regarded as two separate operations and, consequently, have been carried out independently of one another. Plasticizing generally comprises heating of the plastic to form a mass that may be extruded or injection molded.

Dyeing of plastic in the molder's shop is extremely important. Inventory of raw materials can be reduced by storing only uncolored synthetic material (resins) and coloring it as required for use. In a usual process called dry coloring the dry coloring agents are tumbled with the particulate resin in a drum before introduction to the plasticizer. In other processes color concentrates are used; that is, pellets of plastic containing high concentration of color are mixed with the uncolored pellets. Hence, basically the dyeing process heretofore has included metering and mixing steps connected with adequate measures for storing the mixed material.

The plasticization step consists of introducing, blending and heating the mixed materials. This method of operation has the drawback that special apparatus are required for mixing and storing and delivering the variously colored synthetics to the plasticizing device and these special apparatus must be cleaned in a time-consuming manner before a changeover to another dye can be made. In other words, uncolored synthetic material may not be stored in a single container and fed continuously into a processing machine set up adjacent thereto. Situated between these operations would be a tank to contain a sufficiently large amount of dyed synthetic material.

It is an advantage of this invention to avoid expenditure of space and equipment. It is a further advantage of this invention to avoid the drawback that special apparatus are required for mixing, storing and delivering the dyed goods to the plasticizing device, which equipment must be cleaned in a time-consuming manner before changeover to another dye can be made.

According to this invention, a dyeing process is provided in which the dyestuff is introduced without any previous mixing directly to the plasticizing device, a hopper spaced just before the plasticizing device or directly to the extrusion or molding means, for example, extrusion dye or screw press. Preferably, the dyestuff is metered according to the throughput capacity of the extrusion or molding means of the process machine. In one embodiment the dyestuff is introduced without any previous mixing directly and at cyclic intervals into the plasticizing device of a cyclicly operating machine in such a way that the dyestuff is added during each cycle of the machine. This invention is based in part upon the discovery that without separately preparing a dyestuff mixture outside the machine it may be distributed in the plasticizer or the extruder in a manner superior to the dyestuff distribution resulting from the traditional mixing methods. For practical purposes, the drive of the metering mechanism for adding dyestuff is interlocked with the drive of the machine for processing the synthetic material. In a preferred embodiment the dyestuff addition is delivered to the uncolored resin as several partial additions distributed over the plasticizing period of the machine.

Briefly, according to this invention, the dyeing process comprises a metering step for delivering the liquid dyestuff directly to the plasticizer of an extrusion or molding means of a conventional processing machine or to the uncolored resin just before entering the plasticizer. The throughput capacity of the metering device is adjustable and is related to the throughput of the processing machine.

Further features and other objects and advantages will be clear from the following detailed description made with reference to the drawings in which.

Figure 1:
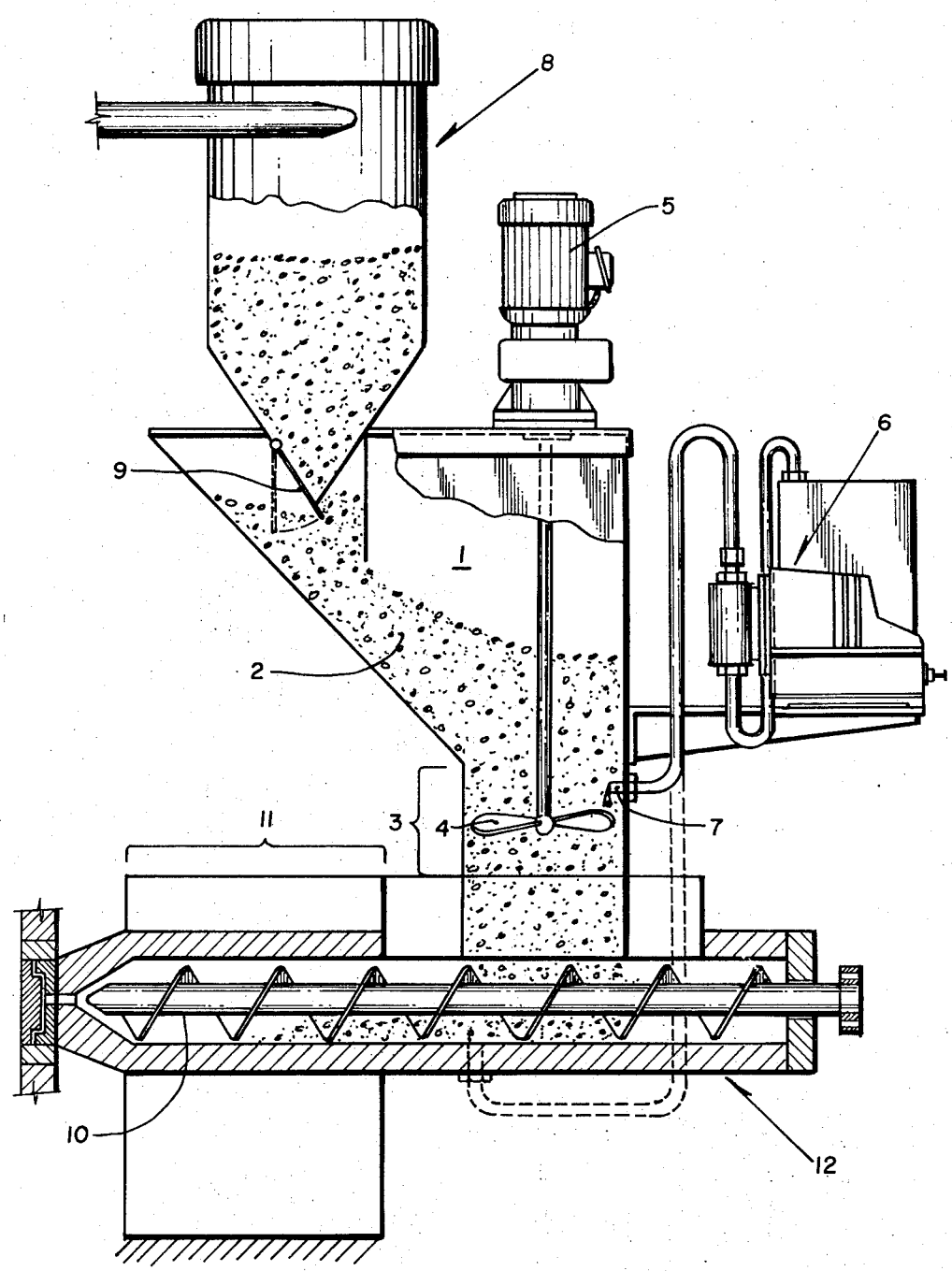
FIG. 1 is a schematic drawing of an injection molding machine.

Referring now to FIG. 1, a mixer 1 in whose mixing zone 3 the granulated synthetic, for example, thermoplastic material 2 and the dyestuff, which is liquid, in this instance enters at an entry point 7 are mixed by means of agitators 4 which are actuated by drive motor 5. The entry point of the liquid dyestuff may be, for example, as shown by the alternate position on FIG. 1 directly to the plasticizer, in which case an agitator 4 and a motor 5 might not be necessary. The metering device for the granulated synthetic material consists of a simple supply tank which at its lower end is provided with a closure cap 9 that opens and closes automatically depending upon the degree of fullness in the mixing hopper 1. Thus, the granulated uncolored synthetic material is metered in dependence upon the throughput capacity of the extrusion machine 10 of an adjacent processing machine 12. In the examples shown in the drawing the extrusion means 10 consists of a screw press with a plasticizing zone 11. The heating elements for the plasticizing zone are not shown in the drawing.

Metering device 6 for delivering the dyestuff may be of any suitable construction. However, it is essential to have the throughput capacity of the metering device 6 coupled with to the throughput capacity of the screw press 10 so that the addition to the dye will be made in dependence on the operating cycle; that is, as a function of the amount of synthetic material which is expelled continuously or discontinuously from the plasticizing zone.

Between the metering device 6 and the drive to the screw press, it is possible to install an automatic meter not shown in the drawing by means of which the functional relationship between the addition of the dye in the amount expelled from the screw press may be varied. However, it is also possible to use a metering device 6 of the type that can be set for variable addition of dye.

Figure 2:
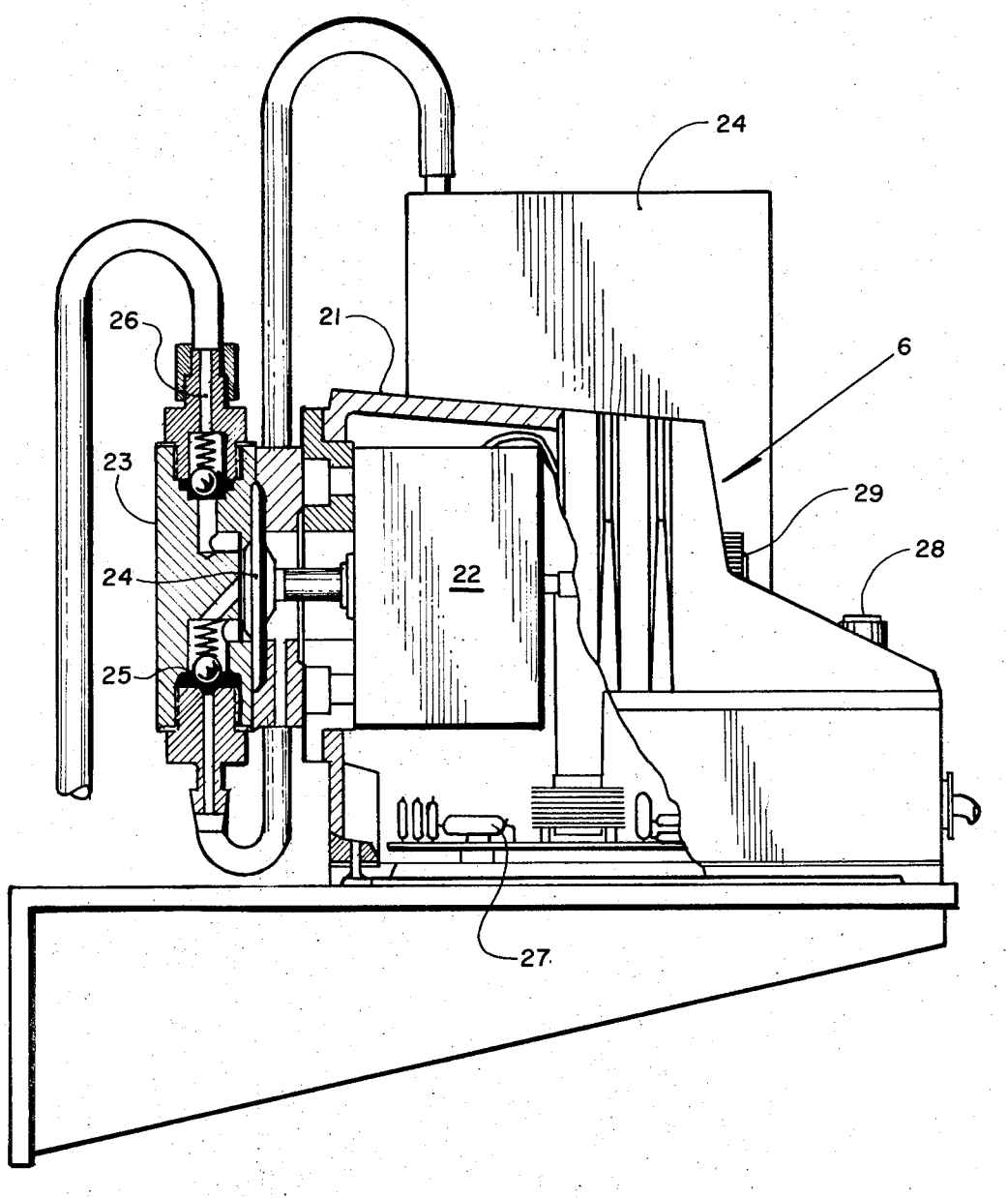
FIG. 2 is a schematic of a preferred metering pump used in the practice of this invention.

Preferably, according to this invention, the metering device 6 comprises an electronically controlled metering diaphragm pump. Referring to FIG. 2, the small amount of liquid dyestuff are conveyed into the mixer 1 in the direction of the arrow shown on the drawing from supply tank 24 by means of another metering pump 6. The metering pump 6 is designed to form an electronically governed variably dosing diaphragm pump with an electromagnet drive. A light metal housing 21 encloses a permanent magnet 22 and an electronic control mechanism 27. The liquid dye is drawn into metering head 23 through a suction tab 25 by the pulsating piston diaphragm 24 and is expelled therefrom through pressure tab 26. The feed performance may be varied over a wide ratio of adjustment of about 1 to 250 by stroke frequency regulator 28 and/or stroke length regulator 29. Preferably, the regulator for the length of strokes should have a range of about 1 to 10 mm and the stroke frequency regulator should have an additional range of about 1 to 25 hertz. Fluctuating back pressures which may range from 4 to 25 $kp/cm^2$ do not effect the high degree of metering accuracy. The above described metering pump is especially suitable for the practice of this invention because of its accurate metering capability. Inaccuracies are naturally greater when the quantity being metered is small as is in the case where a liquid dye is being added directly to the plasticizer. In previous methods where dyeing is done in a separate container, errors in metering can be readily compensated for.

The above described process and apparatus avoid any intermediate mixing or storing of dyed granulated synthetic material and, consequently, the entire process is substantially simplified and can be carried out with less space, equipment and time.

Having thus described the invention with the detail and particularity as required by the patent laws, what is desired to be claimed and protected by letters patent is set forth in the following claims.

I claim:

1. A method for dyeing synthetic resin material in an intermittently working plastic processing machine having a plasticizer unit and a feed hopper for feeding colored resin particles into the plasticizer unit, characterized in the step for introducing liquid dye directly and without pre-mixing with the resin particles into the plasticizer unit at cyclic intervals corresponding to the cyclic intervals of operation of the machine.

2. A method according to claim 1 comprising the steps for metering certain amounts of the liquid dye for introduction into the plasticizer unit corresponding to the cyclic intervals of the processing operation of the machine.

3. A method according to claim 2 comprising the steps for dividing the metered amounts of the liquid dye into several partial amounts which are distributed over the plasticizing period of the machine.

4. A method according to claim 3 comprising the steps for adjusting the functional relation between the amount of the liquid dye introduced into the plasticizer unit and the output of the machine.

5. A method according to claim 4 comprising the steps for metering in accordance with the output of the machine.

\* \* \* \* \*

UNITED STATES PATENT OFFICE
CERTIFICATE OF CORRECTION

Patent No.     3,814,388     Dated     June 4, 1974

Inventor(X)     Peter Jakob

It is certified that error appears in the above-identified patent and that said Letters Patent are hereby corrected as shown below:

In the Foreign Application Priority Data:

--7105798 [U] -- should read --G71 05798.2--

Claim 1, lines 5 and 6, delete "colored" and insert -- uncolored --.

Signed and sealed this 15th day of October 1974.

(SEAL)
Attest:

McCOY M. GIBSON JR.
Attesting Officer

C. MARSHALL DANN
Commissioner of Patents